Oct. 2, 1923.

Re. 15,693

O. MOORE

TROLLEY WHEEL

Original Filed March 26, 1919

Inventor
Otto Moore

By

Attorney

Reissued Oct. 2, 1923.

Re. 15,693

UNITED STATES PATENT OFFICE.

OTTO MOORE, OF FRANKFORT, INDIANA, ASSIGNOR OF ONE-HALF TO GILES S. MOORE, OF FRANKFORT, INDIANA.

TROLLEY WHEEL.

Original No. 1,382,664, dated June 28, 1921, Serial No. 285,264, filed March 26, 1919. Application for reissue filed June 4, 1923. Serial No. 643,450.

*To all whom it may concern:*

Be it known that I, OTTO MOORE, a citizen of the United States, residing at Frankfort, in the county of Clinton and State of Indiana, have invented certain new and useful Improvements in a Trolley Wheel, of which the following is a specification.

This invention relates to improvements in trolley wheels, the object of the invention being to provide what may be termed an automatic sliding and rotating trolley for use on electric cars.

A further object of the invention is to provide an improved trolley wheel which is so formed that parts thereof may be replaced when worn out, without the necessity of replacing the entire wheel.

A further object of the invention is to generally improve the structure of the trolley wheel and to provide a wheel which is comparatively simple in construction and economical in use.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

The same characters of reference designate the same parts in the different figures of the drawings.

Figure 1:
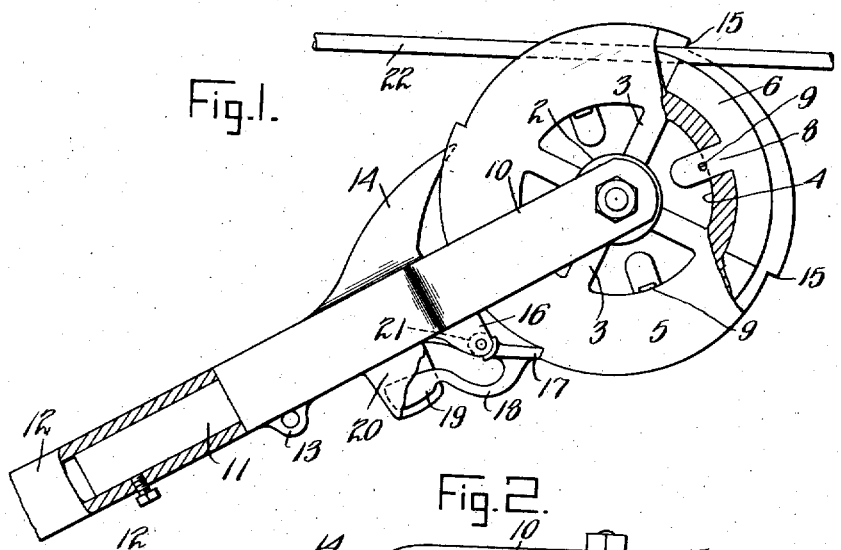
Figure 1 is a side view, partly in section, showing my improved trolley wheel applied to the pole of an electric car, the pole being broken away.
Figure 2:
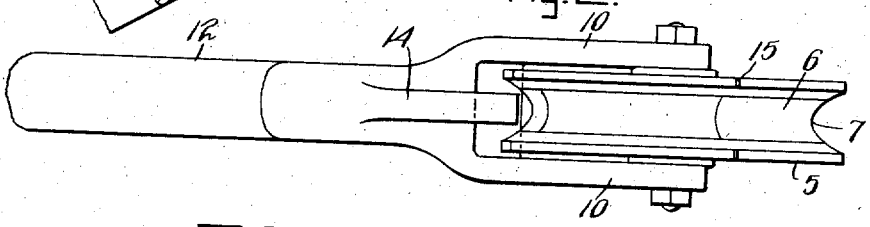
Figure 2 is a top plan view thereof.
Figure 3:
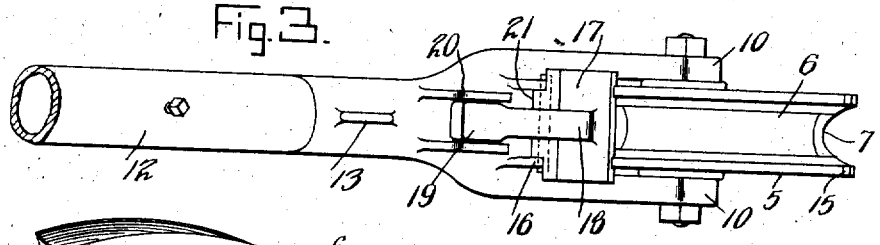
Figure 3 is a bottom plan view.
Figure 4:
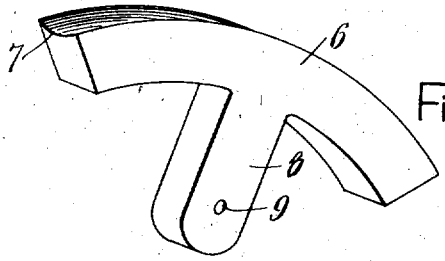
Figure 4 is a perspective view of a segment of the wheel.

Referring to the drawings, the wheel proper consists of a hub 2 having spokes 3 radiating therefrom, and a rim 4 having a flange 5 extending circumferentially thereof at each side of the wheel, thereby forming a depression of considerable depth around the rim of the wheel. The hub 2, spokes 3, rim 4 and flanges 5 are preferably formed in one integral structure. Adapted to fit between the flanges 5 and to be seated on the periphery of the rim 4 are a plurality, shown herein as four in number, of segmental members on fellies 6, each formed with a concave grove 7 in its periphery to adapt it for contact with the wire conductor 22. Formed on the felly 6 at approximately the longitudinal center thereof is a lug 8 which projects inwardly toward the center of the wheel and is adapted to pass through an opening formed in the rim 4, said lug being provided with a transverse opening 9 adapted to receive a cotter pin for securing the segment in position on the rim as shown in Figure 1.

The wheel above described is mounted for rotation between the bifurcated ends 10 of a so-called "harp," said harp being provided with a reduced portion 11 at its opposite end adapted to be secured in the tubular opening in the end of a trolley pole 12. The harp is also provided with a loop or eye 13 at its underside for attachment of the usual rope and at its upper side with a pointed lug or nose 14 adapted to project between the flanges 5 of the wheel, the function of this nose being to prevent the span wires, that is to say, the cross wires which support the wire carrying the current, from catching on the wheel when the trolley jumps off the wire. The loop 13 and nose 14 are preferably cast integral with the harp.

In the present instance I have provided means for holding the wheel against rotation when the car moves forward and for permitting the wheel to rotate when the car is backed up. For this purpose the flanges 5 of the wheel are provided around their peripheries with a plurality of ratchet teeth 15. At the underside of the harp is provided a pair of perforated ears or lugs 16, between which is pivoted a swinging pawl 17 that extends across the path of the wheel and is adapted to normally engage a pair of the ratchet teeth on the flanges 5, as shown in Figure 1. The pawl is provided with an arm 18 carrying at the free end thereof a weight 19, whereby the pawl is maintained normally in engagement with the ratchet teeth. The weighted end 19 of the arm is adapted to move between a pair of lugs 20 secured to or formed integral with the harp, whereby sidewise motion of the arm is prevented. A solid lug or shoulder 21 is formed on the harp between the perforated lugs 16 and back of the pivotal connection of the pawl with said lugs, whereby such pivotal connection is supported against the pressure of the pawl.

From the foregoing it will be seen that when the car is traveling in one direction, as for instance toward the left of Figure 1, the wheel will be held against rotation by reason of the engagement of the pawl with the ratchet teeth, but when the car is backed up or moved in the opposite direction the wheel is free to rotate, whereby a new segment or portion of a segment is automatically brought into engagement with the wire. In case no necessity should arise for backing up the car when it is desired to bring a new segment into contact with the wire, the wheel may be rotated by hand to accomplish the same purpose. It will also be seen that when either or all of the segments 6 become worn they may readily be removed by merely removing the cotter pins from the lugs 8 and taking out the worn segment and substituting a new one therefor, without necessitating the replacement of the entire wheel.

While I have described in detail the structure herein illustrated, it is to be understood that I do not thereby limit my invention to the precise features of construction shown, as I am aware that many mechanical changes may be made therein without departing from the spirit and scope of the invention as set forth in the appended claims.

Having thus fully described my said invention, what I claim as new and desire to secure by Letters Patent, is:

1. In a device of the class described, a harp; a trolley wheel journaled thereon and comprising separately removable tread sections; and a pawl and ratchet connection between the harp and the wheel and operating to hold the wheel against rotation in one direction, thereby to present the tread sections one at a time fixed for sliding engagement with a trolley wire, the pawl and ratchet mechanism permitting a rotation of the wheel in an opposite direction, thereby to present different tread sections for fixed sliding engagement with the wire, substantially as set forth.

2. In a device of the class described, a harp having depending lugs; a wheel journaled on the harp and provided with a ratchet; and a pawl pivoted to the arm and cooperating with the ratchet, the pawl having a rearwardly extended arm received slidably between the lugs and constituting a gravity means for holding the pawl in operative relation to the ratchet wheel, substantially as set forth.

3. In a trolley, a harp, a trolley wheel journaled thereon and comprising separately removable tread sections a pawl on the harp and ratchet teeth on the wheel at the ends of the tread sections to hold the wheel against rotation in one direction but permitting free rotation thereof in the reverse direction, substantially as set forth.

4. In a trolley, a harp, a trolley wheel supported thereby having a removable tread section, and means for holding the wheel against rotation in one direction with said section only in sliding contact with the trolley wire, substantially as set forth.

5. In a trolley, a harp, a trolley wheel supported thereby, separately removable tread sections on the wheel, and means for holding the wheel against rotation with any one of said sections in sole sliding engagement with the trolley wire, substantially as set forth.

In testimony hereof, I have hereunto set my hand and seal at Frankfort, Indiana, this 29th day of May, A. D. nineteen hundred and twenty-three.

OTTO MOORE.